United States Patent
Cheng

(10) Patent No.: US 7,440,146 B2
(45) Date of Patent: Oct. 21, 2008

(54) SCANNING METHOD AND SCANNING SYSTEM FREE OF IDENTIFYING ORIGINAL'S ATTRIBUTE

(75) Inventor: Stone Cheng, Kaohsiung (TW)

(73) Assignee: Transpacific IP, LLP, Taipei (TW)

( * ) Notice: Subject to any disclaimer, the term of this patent is extended or adjusted under 35 U.S.C. 154(b) by 440 days.

(21) Appl. No.: 09/956,111

(22) Filed: Sep. 20, 2001

(65) Prior Publication Data

US 2003/0053160 A1 Mar. 20, 2003

(51) Int. Cl.
H04N 1/04 (2006.01)
(52) U.S. Cl. ................ 358/474; 358/487
(58) Field of Classification Search ............. 358/450, 358/487, 506, 448, 474, 498; 382/312
See application file for complete search history.

(56) References Cited

U.S. PATENT DOCUMENTS

| | | | | | |
|---|---|---|---|---|---|
| 4,879,604 | A | * | 11/1989 | Koshiyouji | 358/474 |
| 4,943,725 | A | * | 7/1990 | Ono et al. | 250/584 |
| 5,392,100 | A | * | 2/1995 | Yoshida | 399/211 |
| 5,475,509 | A | * | 12/1995 | Okamoto | 358/518 |
| 5,550,650 | A | * | 8/1996 | Pan | 358/474 |
| 5,574,274 | A | * | 11/1996 | Rubley et al. | 250/208.1 |
| 5,608,537 | A | * | 3/1997 | Manabe et al. | 358/401 |
| 5,663,812 | A | * | 9/1997 | Pan | 358/474 |
| 5,666,611 | A | * | 9/1997 | Chuan | 399/203 |
| 5,818,611 | A | * | 10/1998 | Shih | 358/474 |
| 5,960,448 | A | * | 9/1999 | Reichek et al. | 715/526 |
| 6,151,139 | A | * | 11/2000 | Haded et al. | 358/487 |
| 6,195,181 | B1 | * | 2/2001 | Washizu | 358/475 |
| 6,295,388 | B1 | * | 9/2001 | Stokes et al. | 382/312 |
| 6,362,829 | B1 | * | 3/2002 | Omvik et al. | 345/593 |
| 6,385,351 | B1 | * | 5/2002 | Simske et al. | 382/312 |
| 6,385,384 | B1 | * | 5/2002 | Wei | 385/141 |
| 6,400,484 | B1 | * | 6/2002 | Wang et al. | 359/196 |
| 6,492,782 | B2 | * | 12/2002 | Ishizuka | 315/360 |
| 6,531,697 | B1 | * | 3/2003 | Nakamura et al. | 250/311 |
| 6,751,780 | B1 | * | 6/2004 | Neff et al. | 715/530 |
| 6,771,401 | B2 | * | 8/2004 | Chen | 358/512 |
| 2001/0046070 | A1 | * | 11/2001 | Kito et al. | 358/505 |
| 2002/0080460 | A1 | * | 6/2002 | Yeh | 359/212 |
| 2002/0118406 | A1 | * | 8/2002 | Huang | 358/506 |
| 2003/0043351 | A1 | * | 3/2003 | Ochi et al. | 355/18 |
| 2003/0053160 | A1 | * | 3/2003 | Cheng | 358/527 |

FOREIGN PATENT DOCUMENTS

CN  1206162 A  1/1999

* cited by examiner

Primary Examiner—Jerome Grant, II
(74) Attorney, Agent, or Firm—Stolowitz Ford Cowger LLP

(57) ABSTRACT

In accordance with the present invention, an operating procedure of a scanning system free of identifying original's attribute comprises steps of scanning at least one original free of identifying original's attribute to generate at least one image, wherein the images present all contents of the originals, displaying the images on a preview window, receiving a portion of the preview window selected by a user, and scanning a portion of the originals corresponding to the portion of the preview window. The present invention further extends to a scanning system free of identifying original's attribute and a scanning method without identifying an original's attribute by a user.

26 Claims, 5 Drawing Sheets

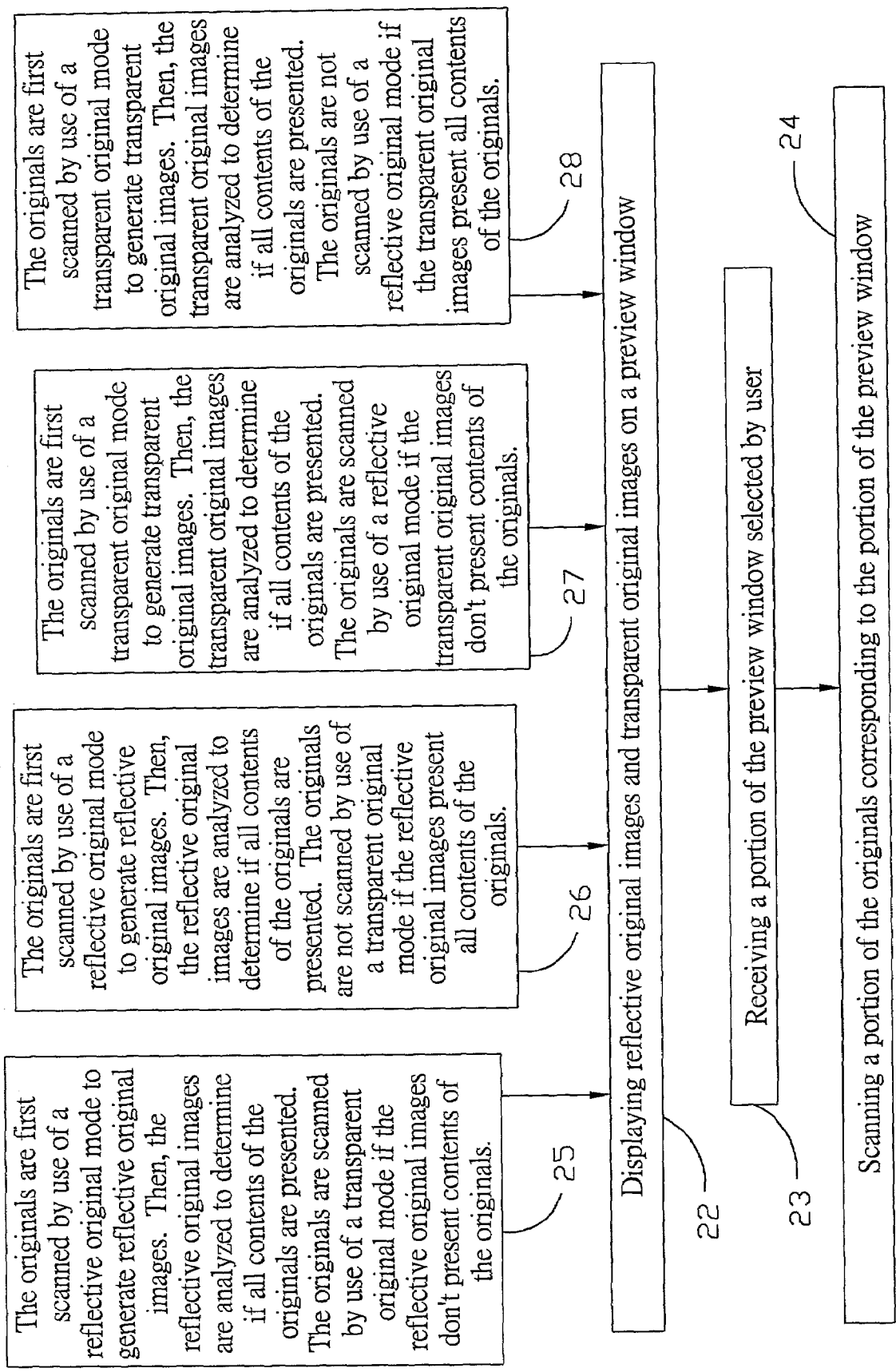

SCANNING METHOD AND SCANNING SYSTEM FREE OF IDENTIFYING ORIGINAL'S ATTRIBUTE

BACKGROUND OF THE INVENTION

1. Field of the Invention

The present invention generally relates to a method for scanning an original without identifying the original's attribute and also a system for scanning an original free of identifying the original's attribute.

2. Description of the Prior Art

For a scanning system, an item to be scanned is usually classified as transparent original or reflective original, according to whether the light can transmit through the item or not. Due to the difference in nature between a reflective original and a transparent original, a reflective original mode is used for scanning a reflective original, and a transparent original has to be scanned by use of a transparent original mode, respectively. In other words, a reflective original can not be identified by use of a transparent original mode, in the mean time a transparent original mode can not recognize a reflective original.

A conventional scanning system has difficulties in identifying reflective and transparent originals simultaneously. Therefore, in order to generate an accurate scanning image, a user himself has to identify the attribute of an original in advance to manually set the proper scanning mode of the scanning system. If the scanning mode of a scanning system (such as scanner) doesn't match with the original, for example, a reflective original is scanned by use of a transparent original mode, the scanning image is incapable of presenting the content of the original.

Apparently, the step of setting the scanning mode complicates the scanning procedure and causes great inconvenience of operating the scanning system leading to the increase in the possibility of generating an improper scanning image due to the wrong scanning mode setting. Thus, it is imperative to develop a method and a system for scanning an original eliminating the step of manually setting the scanning mode.

SUMMARY OF THE INVENTION

In accordance with the present invention, a method and a system for scanning an original to generate a perfect scanning image eliminating the steps of manually identifying the original and setting the scanning mode are provided.

It is another object of this invention that a method and a system for scanning an original to generate a scanning image of a reflective or transparent original without changing the hardware of a reflective or transparent scanning system are provided.

In accordance with the present invention, in one embodiment, an operating procedure of a scanning system, which scans an original free of identifying the original's attribute is disclosed. The operating procedure comprises the step of scanning at least one original to generate at least one image of the originals, wherein the images present all contents of the originals. Then, the images are displayed in a preview window. A portion of the preview window including a portion of the images selected by user is received. Next, a portion of the originals corresponding to the portion of the images displayed in the selected preview window is scanned.

In another embodiment, a system for scanning originals without identifying the attribute of originals is provided. The system comprises a scanning module for scanning at least one original, a processing module for processing a plurality of images generated by the scanning module, a controlling module for controlling the scanning module and the processing module, a display module for displaying a preview window responsive to results of the processing module, a receiving module for receiving a portion of the preview window selected by user, and an output module for outputting the portion of images displayed in the selected preview window.

In accordance with the present invention, in a further embodiment, a scanning method free of identifying original's attribute by a user is provided. The method comprises a step of arranging at least one original on a scanner. The originals are scanned to generate at least one image corresponding to the originals, wherein the images present all contents of the originals and are automatically obtained by the scanner without manually setting any scan mode by the user. Then, a preview window with the images including reflective original images and transparent original images displayed is received. A portion of the preview window including a portion of the images is selected. Then, a portion of the originals corresponding to the portion of the images on the portion of the preview window is scanned.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein:

FIGS. 2A and 2B are an operating procedure of the present invention and designs around the present invention, in one embodiment;

DESCRIPTION OF THE PREFERRED EMBODIMENT

Some sample embodiments of the invention will now be described in greater detail. Nevertheless, it should be noted that the present invention can be practiced in a wide range of other embodiments besides those explicitly described, and the scope of the present invention is expressly not limited except as specified in the accompanying claims.

According to a careful analysis of the scanning system and the scanning method in the prior art, the drawback occurs by using only one scanning mode in one scanning procedure. Users must correctly set the scanning mode in view of an original, or a scanner has to identify the original as a reflective original or a transparent original prior to scanning the original as a result of using only one scanning mode.

Figure 1A:
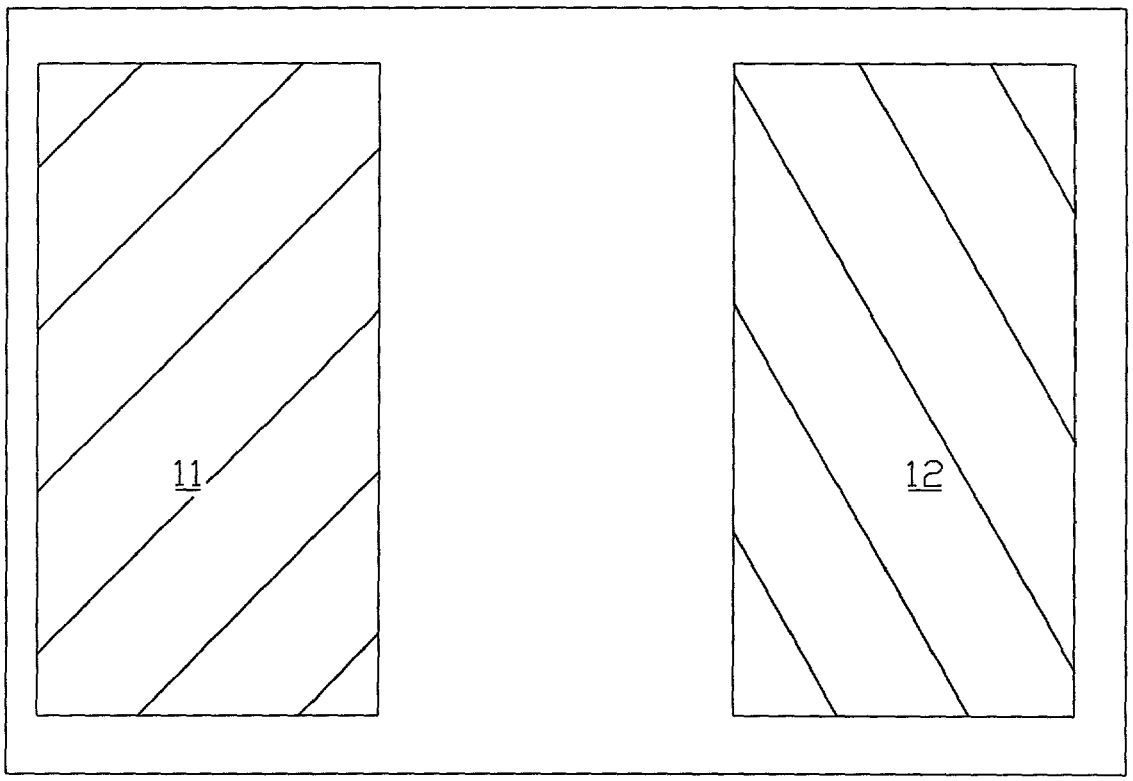
FIG. 1A to 1C illustrates images of different original's attribute displayed in the preview window varied with the scanning mode.
Figure 1B:
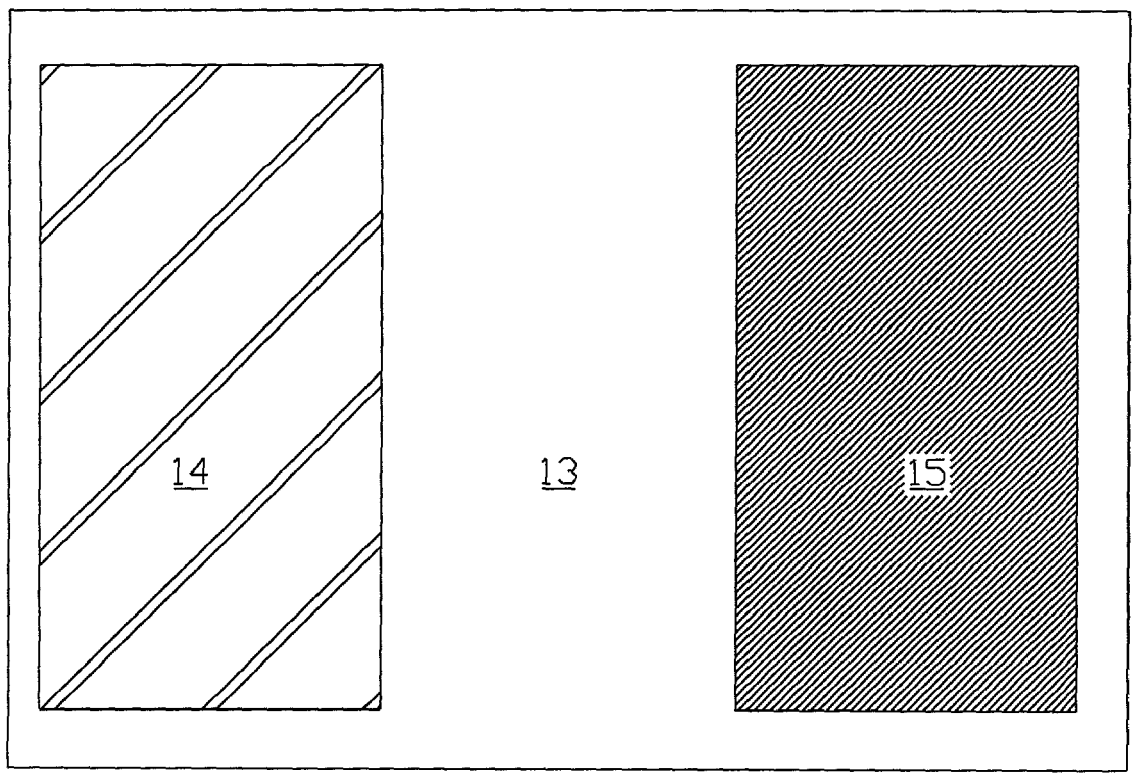
Figure 1C:
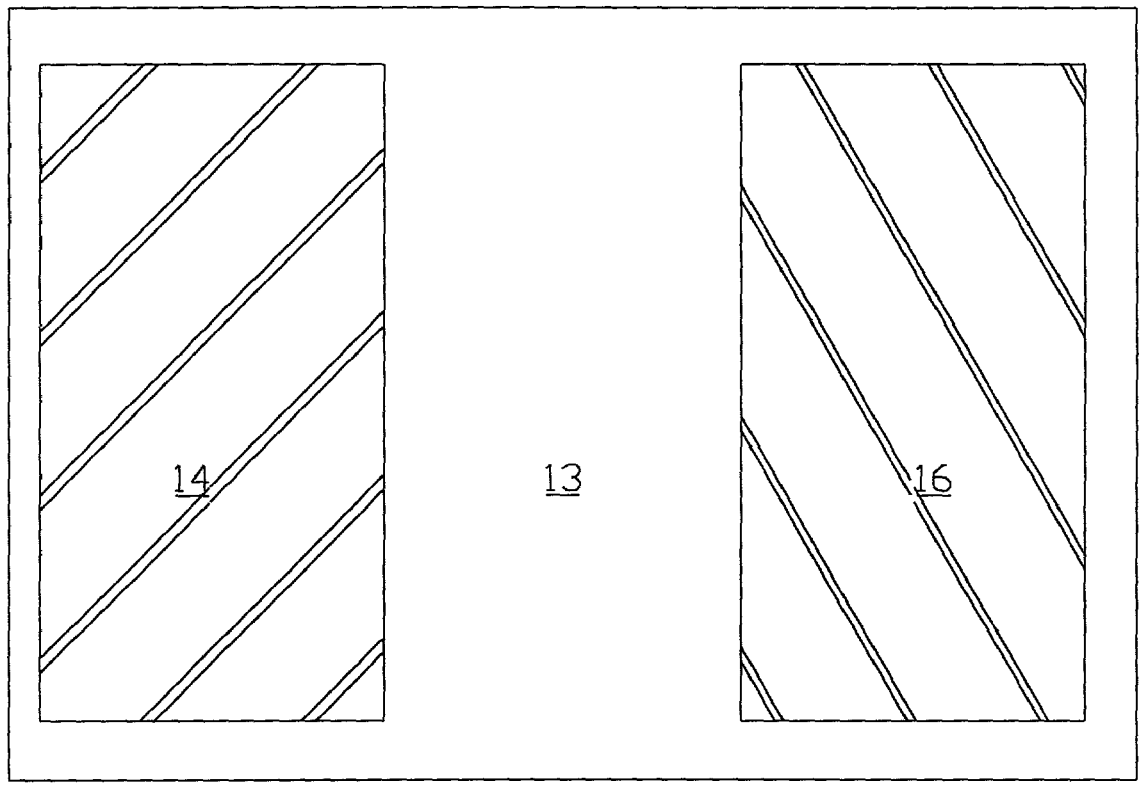

In other words, as shown in FIG. 1A, when there is a reflective original 11 and a transparent original 12 to be simultaneously scanned, due to the use of only one scanning mode in the prior art, such as by use of a reflective original mode, a reflective original image 14 is clearly displayed in a preview window 13 and an ineffective image 14 corresponding to the transparent original 12 also displayed in the preview window 13 is pitch-dark and unrecognizable, as illustrated in FIG. 1B. A further step of setting the scanning mode, such as transparent original mode, is compulsory for identifying the transparent original 12, such that both the reflective original image 14 and the transparent original image 16 are clearly displayed in the preview window 13, as shown in FIG. 1C.

However, due to the continuous advancement of technology, the scanner in the present day has faster scanning speed than the scanner in the old days, and the storage media nowadays also has larger storage capacity and faster accessing rate than before. Thus, one key aspect of the present invention for solving the drawback occurred in the prior art is the use of two scanning modes to scan originals, then by the integration of obtained reflective original images and transparent original images, a completed preview window is secured. Due to the utilization of two scanning modes to scan originals prior to displaying a preview window, the preview window shown in FIG. 1B is eliminated. The preview window illustrated in FIG. 1C is directly obtained in the scan of originals shown in FIG. 1A. In other words, there is no need for users to set the scanning mode prior to starting the scan to acquire a preview window with clear images of both originals, thus the drawback described above is diminished.

Additionally, the original (or originals, or an item is an integration of reflective and transparent originals) to be scanned is not always a combination of reflective and transparent originals, that is, it is not necessary to use both scanning modes (reflective original mode and transparent original mode) in every scan. Thus, another key aspect of the present invention is to scan at least one original by use of one scanning mode, then to analyze whether the information obtained in the scan presents all contents of the original to determine if another scanning mode is to be performed. If the information does not clearly present all contents of the original, another scanning mode is utilized for scanning the original. On the contrary, a preview window is created responsive to the information without scanning the original by another scanning mode if the information clearly presents all contents of the original.

Figure 2A:
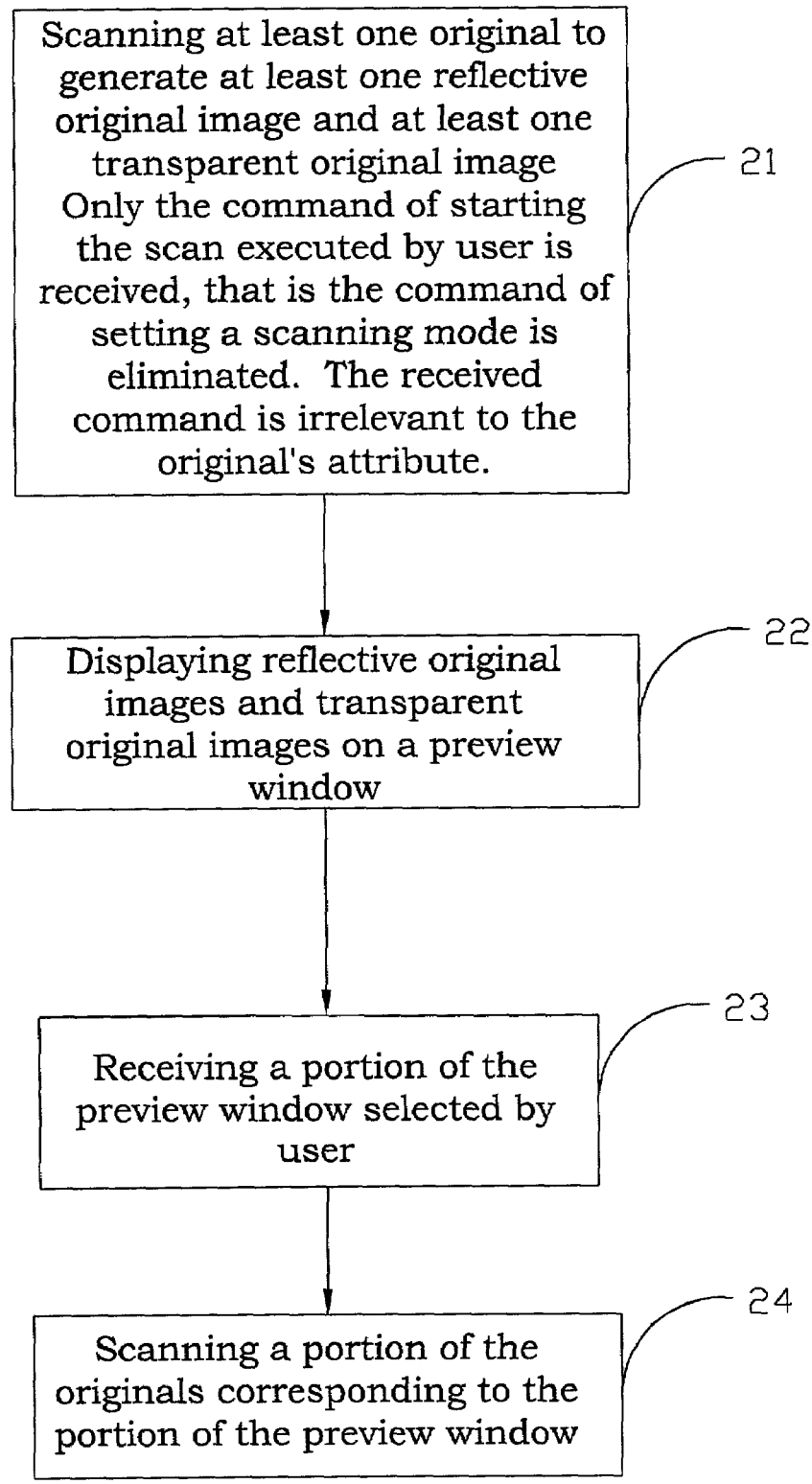

In order to specifically interpret the present invention, in one embodiment, an operating procedure of a scanning system free of identifying original's attribute is provided. As Illustrate in FIG. 2A, the operating procedure comprises steps 21, 22, 23, and 24.

As shown in first scanning block 21, at least one original is scanned to generate at least one image, wherein the images present all contents of the originals. It is noted that only the command of starting the scan executed by user is received, that is the command of setting a scanning mode is eliminated. Thus, the received command is irrelevant to the original's attribute.

In general, the originals are scanned by use of a transparent original mode and a reflective original mode. It is noted that the sequence of employing what mode, the reflective original mode or the transparent original mode, is arbitrary and not critical in accordance with the present invention.

Yet, though the key aspect of the present invention is to obtain reflective original images and transparent original images before a preview window is displayed, the reflective original images are not in want of acquisition when the originals are all transparent originals, or when the originals are all reflective originals, the transparent original images are not in want of acquisition. Therefore, the present invention further comprises variations depicted in modified steps 25, 26, 27, and 28 of FIG. 2B. The modified steps 25, 26, 27, and 28 are not all performed only if the preview window shows completed images corresponding to the originals. The present invention is not limited to the sequence of starting what step first, that is the order of performing steps 25, 26, 27, and 28 is reversible.

As illustrated in first modified step 25, the originals are first scanned by use of a reflective original mode to generate reflective original images. Then, the reflective original images are analyzed to determine if all contents of the originals are presented. The originals are scanned by use of a transparent original mode if the reflective original images don't present all contents of the originals.

As illustrated in second modified step 26, the originals are first scanned by use of a reflective original mode to generate reflective original images. Then, the reflective original images are analyzed to determine if all contents of the originals are presented. The originals are not scanned by use of a transparent original mode if the reflective original images present all contents of the originals. Thus, only the reflective original images are displayed in the preview window.

As illustrated in third modified step 27, the originals are first scanned by use of a transparent original mode to generate transparent original images. Then, the transparent original images are analyzed to determine if all contents of the originals are presented. The originals are scanned by use of a reflective original mode if the transparent original images don't present all contents of the originals.

As illustrated in fourth modified step 28, the originals are first scanned by use of a transparent original mode to generate transparent original images. Then, the transparent original images are analyzed to determine if all contents of the originals are presented. The originals are not scanned by use of a reflective original mode if the transparent original images present all contents of the originals. Thus, only the transparent original images are displayed in the preview window.

As shown in preview block 22, reflective original images and transparent original images are displayed in a preview window.

It is noted that there is no specific rule of displaying images on the preview window. The reflective original images and the transparent original images can be separately displayed in the preview window. However, the reflective original images and the transparent original images can also be combined to display on the preview window, wherein a portion of the originals not presented by the transparent original images is substituted by the reflective original images. In the mean time, a portion of the originals not presented by the reflective original images is substituted by the transparent original images.

As shown in receiving block 23, a portion of the preview window with a portion of the images is selected by a user. It is clear that the user can further taking steps of performing an image process.

As shown in second scanning block 24, a portion of the originals corresponding to the portion of the images displayed in the portion of the preview window is scanned.

In the second scan of the portion of the originals, if the selected images displayed in the selected preview window is part of the reflective original images, only a reflective original mode is used. If the selected images displayed in the selected preview window is part of the transparent original images, only a transparent original mode is used. If the selected images displayed in the selected preview window is part of the transparent original images and the reflective original images, a transparent original mode is used to scan the portion of originals corresponding to the selected transparent original images, and a reflective original mode is used to scan the portion of originals corresponding to the selected reflective original images.

Figure 3:
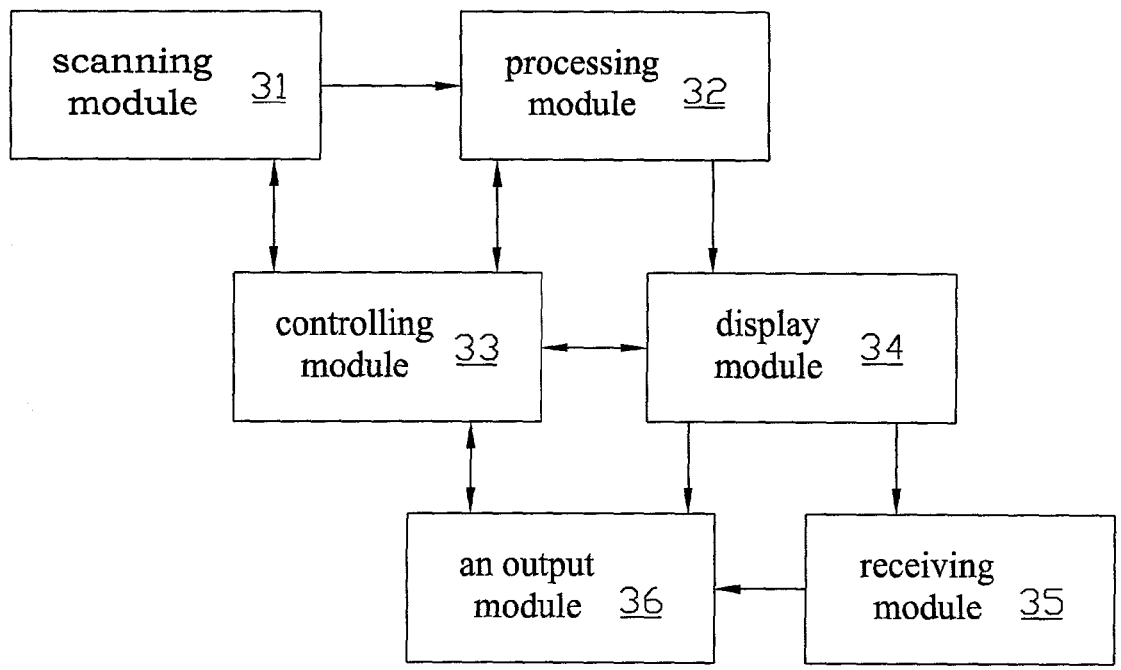
FIG. 3 is a structure in another embodiment in accordance with the present invention.

In another embodiment, a scanning system free of identifying original's attribute is provided. Referring to FIG. 3, the scanning system comprises a scanning module 31, a processing module 32, a controlling module 33, a display module 34, a receiving module 35, and an output module 36.

The scanning module 31 including units, such as a light source, a lens, and a light detector, is for scanning at least one original.

The processing module 32, such as microprocessor or application specific integrated circuit (ASIC), is for processing a plurality of images generated by the scanning module 31.

The controlling module 33, such as microprocessor or application specific integrated circuit, is for controlling the scanning module 31 and the processing module 32.

The controlling module 33 controls the scanning module 31 to scan the originals by use of a transparent original mode or a reflective original mode to obtain transparent original images or reflective original images, respectively. But as described above, the controlling module 33 can control the scanning module 31 to scan the originals by use of a transparent original mode first, wherein transparent original images are displayed by the display module 34 if the processing module shows the transparent original images present all contents of the originals. If the processing module 32 shows the transparent original images don't present all contents of the originals, the originals are scanned by use of a reflective original mode, then the transparent original images and the reflective original images are displayed by the display module 34. Alternatively, the controlling module 33 can control the scanning module 31 to scan the originals by use of a reflective original mode first, wherein reflective original images are displayed by the display module 34 if the processing module shows the reflective original images present all contents of the originals. If the processing module 32 shows the reflective original images don't present all contents of the originals, the originals are scanned by use of a transparent original mode, then the reflective original images and the transparent original images are displayed by the display module 34.

The display module 34, such as screen, is for displaying a preview window responsive to a result of the processing module. When the reflective original images can represent all contents of the originals, the display module 34 does not display any transparent original images. When the transparent original images can represent all contents of the originals, the display module 34 does not display any reflective original images. Additionally, the display module 34 can separately display the reflective original images and the transparent original images. The reflective original images and the transparent original images can also be combined to display by the display module 34, wherein a portion of the originals not presented by the transparent original images is substituted by the reflective original images. In the mean time, a portion of the originals not presented by the reflective original images is substituted by the transparent original images.

The receiving module 35, such as mouse or keyboard, is for receiving a portion of the preview window selected by user.

The output module 36, such as printer, hard disc, floppy disk, or any storage media of the computer, is for outputting a portion of images displayed in the selected portion of the preview window.

Figure 4:
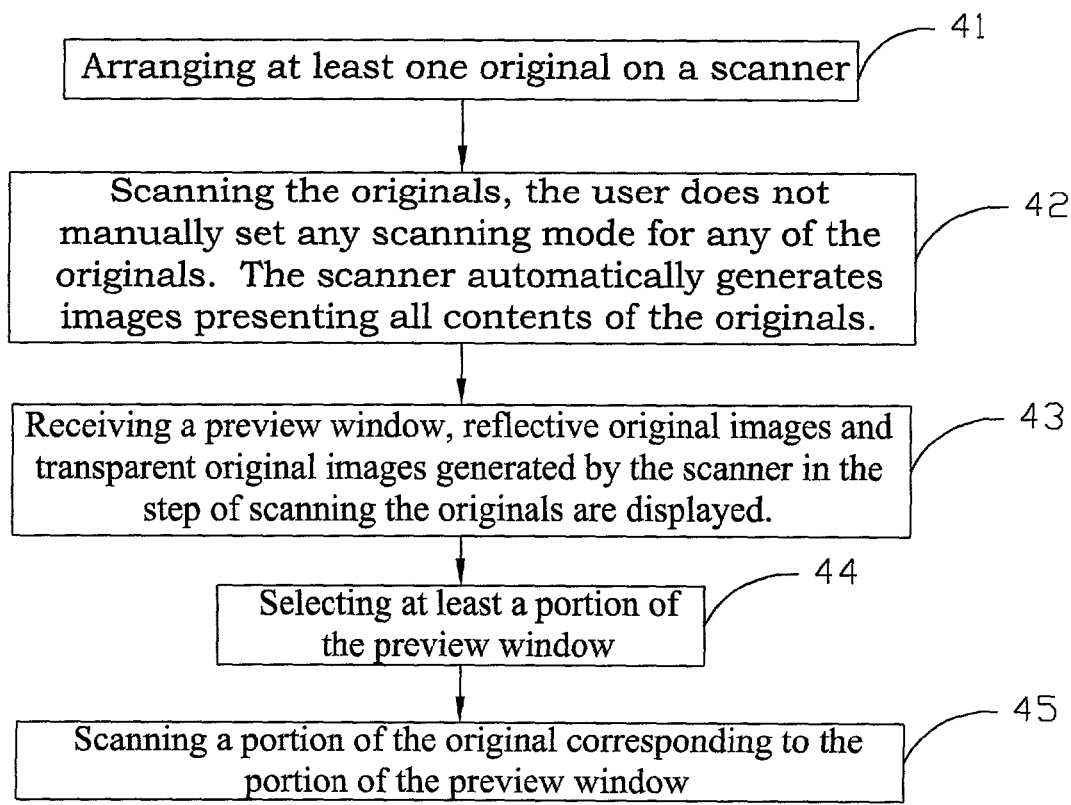
FIG. 4 is an operating procedure in a further embodiment in accordance with the present invention.

In accordance with the present invention, in a further embodiment, a method for scanning free of identifying original's attribute by a user is provided. Referring to FIG. 4, the method comprises a step of arranging at least one original on a scanner shown in pre-scan block 41.

As depicted in first scanning block 42, the originals are scanned. The user does not manually set any scanning mode for any of the originals. The scanner automatically generates images presenting all contents of the originals.

As shown in preview block 43, a preview window is received. The preview window displays reflective original images and transparent original images generated by the scanner in the step of scanning the originals.

As shown in selection block 44, at least a portion of the preview window is selected.

Referring to scanning block 45, a portion of the original corresponding to the selected portion of the preview window is scanned.

Although specific embodiments have been illustrated and described, it will be obvious to those skilled in the art that various modifications may be made without departing from what is intended to be limited solely by the appended claims.

What is claimed is:

1. A method, comprising:
   scanning at least one original to generate at least one image, wherein said at least one original is scanned using a reflective original mode and a transparent original mode during the same scanning operation;
   displaying said at least one image on a preview window;
   receiving a selected portion of said preview window; and
   scanning at least a portion of said at least one original corresponding to said selected portion of said preview window.

2. The method of claim 1, wherein scanning said at least one original comprises sequentially scanning the at least one original by use of said reflective original mode and said transparent original mode.

3. The method of claim 1, wherein scanning said at least one original comprises sequentially scanning the at least one original by use of said transparent original mode and said reflective original mode.

4. The method of claim 1, wherein said scanning said at least one original comprises:
   scanning said at least one original by use of said reflective original mode to generate at least one reflective original image;
   judging whether said at least one reflective original image presents the contents of said at least one original; and
   scanning said at least one original by use of said transparent original mode if said at least one reflective original image does not present the contents of said at least one original.

5. The method of claim 1, wherein said scanning said at least one original comprises:
   scanning said at least one original by use of said transparent original mode to generate at least one transparent original image;
   judging whether said at least one transparent original image presents the contents of said at least one original; and
   scanning said at least one original by use of said reflective original mode if said at least one transparent original image does not present said contents of said at least one original.

6. The method of claim 1, wherein displaying said at least one image comprises displaying a reflective original image and a transparent original image separately in said preview window.

7. The method of claim 1, wherein displaying said at least one image comprises displaying a combination of a reflective original image and a transparent original image on said preview window, wherein a portion of said at least one original not presented by said transparent original image is substituted by said reflective original image, wherein a portion of said at least one original not presented by said reflective original image is substituted by said transparent original image.

8. The method of claim 7, wherein said scanning of said portion of said at least one original comprises:
if said portion of said preview window is part of said reflective original image, said reflective original mode is used, and if said portion of said preview window is part of said transparent original image, said transparent original mode is used.

9. The method of claim 7, wherein said scanning of said portion of said at least one original comprises;
if said portion of said preview window is part of said transparent original image and said reflective original image, said transparent original mode is used to scan said portion of said at least one original corresponding to said part of said transparent original image, and said reflective original mode is used to scan said portion of said at least one original corresponding to said part of said reflective original image.

10. A scanning system, comprising:
a scanning module capable of scanning at least one original;
a processing module capable of processing a plurality of images generated by said Scanning module;
a controlling module capable of controlling said scanning module and said processing module, the controlling module configured to cause the scanning module to scan said at least one original using a transparent original mode and a reflective original mode during the same scanning operation;
a display module capable of displaying a preview window responsive to a result of said processing module;
a receiving module capable of receiving a selected portion of said preview window; and
an output module capable of outputting a portion of images displayed in said portion of said preview window.

11. The scanning system according to claim 10, wherein said controlling module is capable of controlling said scanning module to sequentially scan said at least one original by use of said transparent original mode and said reflective original mode.

12. The scanning system according to claim 10, wherein said controlling module is capable of controlling said scanning system to scan said at least one original by use of said transparent original mode to generate a transparent original image, wherein said transparent original image is displayed in said preview window by said display module if said result of said processing module shows said transparent original image presents said contents of said at least one original, if said result of said processing module shows said transparent original image does not present said contents of said at least one original, said at least one original is scanned by use of said reflective original mode to generate a reflective original image, and said transparent original image and said reflective original image are displayed in said preview window by said display module.

13. The scanning system according to claim 10, wherein said controlling module is capable of controlling said scanning system to scan said originals by use of said reflective original mode to generate a reflective original image, wherein said reflective original image is displayed in said preview window by said display module if said result of said processing module shows said reflective original image presents said contents of said at least one original if said result of said processing module shows said reflective original image does not present said contents of said at least one original, said at least one original is scanned by use of said transparent original mode to generate a transparent original image, and said reflective original image and said transparent original image are displayed in said preview window by said display module.

14. The scanning system according to claim 10, wherein said scanning module is capable of generating at least one reflective original image, and wherein if said reflective original image presents the contents of said at least one original, said display module does not display any transparent original image.

15. The scanning system according to claim 10, wherein said scanning module is capable of generating at least one transparent original image, wherein if said transparent original image presents the contents of said at least one original, said display module does not display any reflective original image.

16. The scanning system according to claim 10, wherein said display module is capable of displaying a reflective original image and a transparent original image.

17. The scanning system according to claim 10, wherein said at least one original image comprises a reflective original image and a transparent original image, wherein said reflective original image and said transparent original image are capable of being combined to display on said preview window, wherein a portion of said at least one original not presented by said transparent original image is substituted by said reflective original image, and wherein a portion of said at least one original not presented by said reflective original image is substituted by said transparent original image.

18. An apparatus comprising:
means for scanning at least one original to generate at least one image, wherein said at least one original is scanned using a reflective original mode and a transparent original mode during the same scanning operation;
means for displaying said at least one image on a preview window;
means for receiving a selected portion of said preview window; and
means for scanning a portion of said at least one original corresponding to said selected portion of said preview window.

19. A method, comprising:
scanning an original document using a reflective mode and a transparent mode during the same scanning operation;
determining whether one or more portions of the original document are reflective or transparent based on the scan; and
rescanning at least a portion of the original document using the reflective mode when the portion of the original document is determined to be reflective, or using the transparent mode when the portion of the original document is determined to be transparent.

20. The method of claim 19, wherein scanning an original document comprises scanning the original document using a reflective document mode followed by a transparent document mode.

21. The method of claim 19, wherein scanning an original document comprises scanning the original document using a transparent document mode followed by a reflective document mode.

22. An apparatus, comprising:
means for scanning an original document using a reflective mode and a transparent mode during the same scanning operation; and
means for determining whether the original document is a reflective original or a transparent original based on the scan, where the means for scanning is configured to rescan at least a portion of the original document with the reflective mode when the original document is the reflective original, and configured to rescan at least the portion of the original document with the transparent mode when the original document is the transparent original.

23. The apparatus of claim 22, wherein the means for scanning an original document includes means for scanning the original document using a reflective document mode followed by a transparent document mode.

24. The apparatus of claim 22, wherein the means for scanning an original document includes means for scanning the original document using a transparent document mode followed by a reflective document mode.

25. The method of claim 19, wherein the rescanning of at least the portion of the original document is performed when at least the portion is selected from a preview window displaying one or more of the scans.

26. The apparatus of claim 22, wherein the means for scanning is configured to rescan the portion of the original document when the portion is selected from a preview window displaying one or more of the scans.

* * * * *

UNITED STATES PATENT AND TRADEMARK OFFICE
CERTIFICATE OF CORRECTION

PATENT NO. : 7,440,146 B2
APPLICATION NO. : 09/956111
DATED : October 21, 2008
INVENTOR(S) : Stone Cheng It is certified that error appears in the above-identified patent and that said Letters Patent is hereby corrected as shown below:

At column 7, line 13, please delete "comprises;" and insert -- comprises: --.

At column 7, line 26, please delete "Scanning" and insert -- scanning --.

At column 8, line 31, please delete "apparatus" and insert -- apparatus, --.

Signed and Sealed this

Ninth Day of November, 2010

David J. Kappos
*Director of the United States Patent and Trademark Office*